(12) United States Patent
Oka

(10) Patent No.: US 7,614,685 B2
(45) Date of Patent: Nov. 10, 2009

(54) VEHICLE SIDE DOOR STRUCTURE

(75) Inventor: Yukio Oka, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/155,305

(22) Filed: Jun. 2, 2008

(65) Prior Publication Data

US 2008/0315619 A1    Dec. 25, 2008

(30) Foreign Application Priority Data

Jun. 22, 2007    (JP)    ............... 2007-164789

(51) Int. Cl.
    *B60J 5/04*    (2006.01)
(52) U.S. Cl. ............... 296/187.12; 296/146.6; 180/274; 280/735
(58) Field of Classification Search ............ 296/187.12, 296/146.5, 146.6; 280/735; 180/274
    See application file for complete search history.

(56) References Cited

U.S. PATENT DOCUMENTS

| | | | |
|---|---|---|---|
| 5,281,780 A * | 1/1994 | Haland | .............. 200/52 R |
| 5,392,024 A * | 2/1995 | Kiuchi et al. | .............. 340/436 |
| 5,566,974 A | 10/1996 | Mazur et al. | |
| 6,203,060 B1 * | 3/2001 | Cech et al. | .............. 280/735 |
| 7,311,169 B1 * | 12/2007 | Caliskan et al. | .............. 180/274 |
| 2008/0100046 A1 * | 5/2008 | Hayakawa et al. | .............. 280/735 |
| 2008/0284145 A1 * | 11/2008 | Breed | .............. 280/736 |

FOREIGN PATENT DOCUMENTS

| | | |
|---|---|---|
| JP | U-6-1035 | 1/1994 |
| JP | A 7-2049 | 1/1995 |
| JP | A 9-290705 | 11/1997 |
| JP | 409315264 A * | 12/1997 |
| JP | A-10-509108 | 9/1998 |
| JP | 410315905 A * | 12/1998 |
| JP | B2-3331861 | 7/2002 |
| JP | B2-3371649 | 11/2002 |
| JP | B2-3463510 | 8/2003 |
| JP | A-2005-162016 | 6/2005 |
| WO | WO 95/31357 | 11/1995 |

* cited by examiner

*Primary Examiner*—Jason S Morrow
(74) *Attorney, Agent, or Firm*—Oliff & Berridge, PLC

(57) ABSTRACT

A vehicle side door structure includes an inner panel, an outer panel that is positioned on the outside of the inner panel in the vehicle-width direction, and that forms a closed space in cooperation with the inner panel. In addition, an impact beam extends in the longitudinal direction of a vehicle body, and is arranged within the closed space at a position close to the outer panel, a bracket is attached to the inner panel and holds, at a portion which is on the inner side of the inner panel in the vehicle-width direction, a collision detector, and a load transmission member connects the impact beam to the inner panel at a portion that overlaps the bracket from a lateral view.

13 Claims, 6 Drawing Sheets

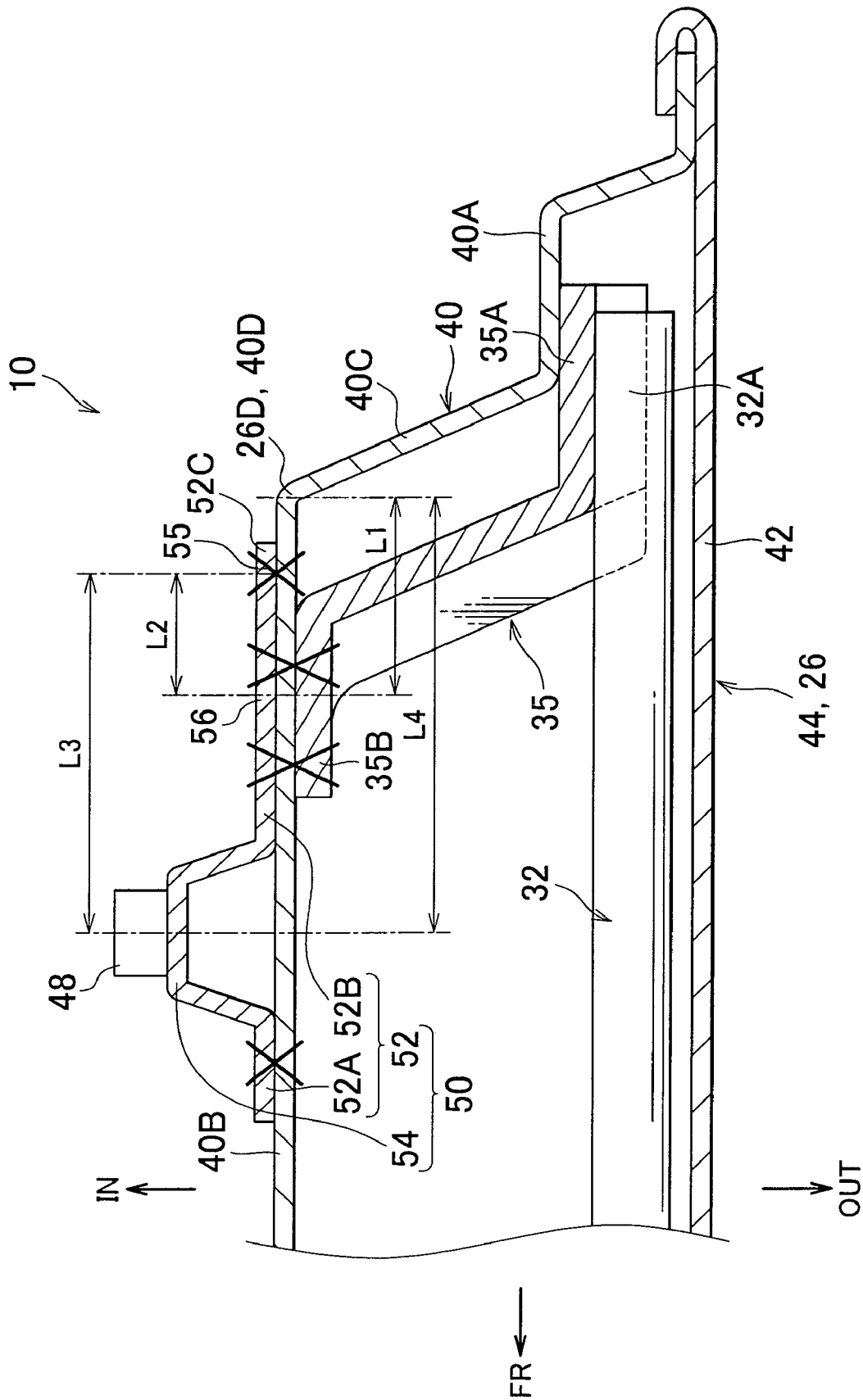

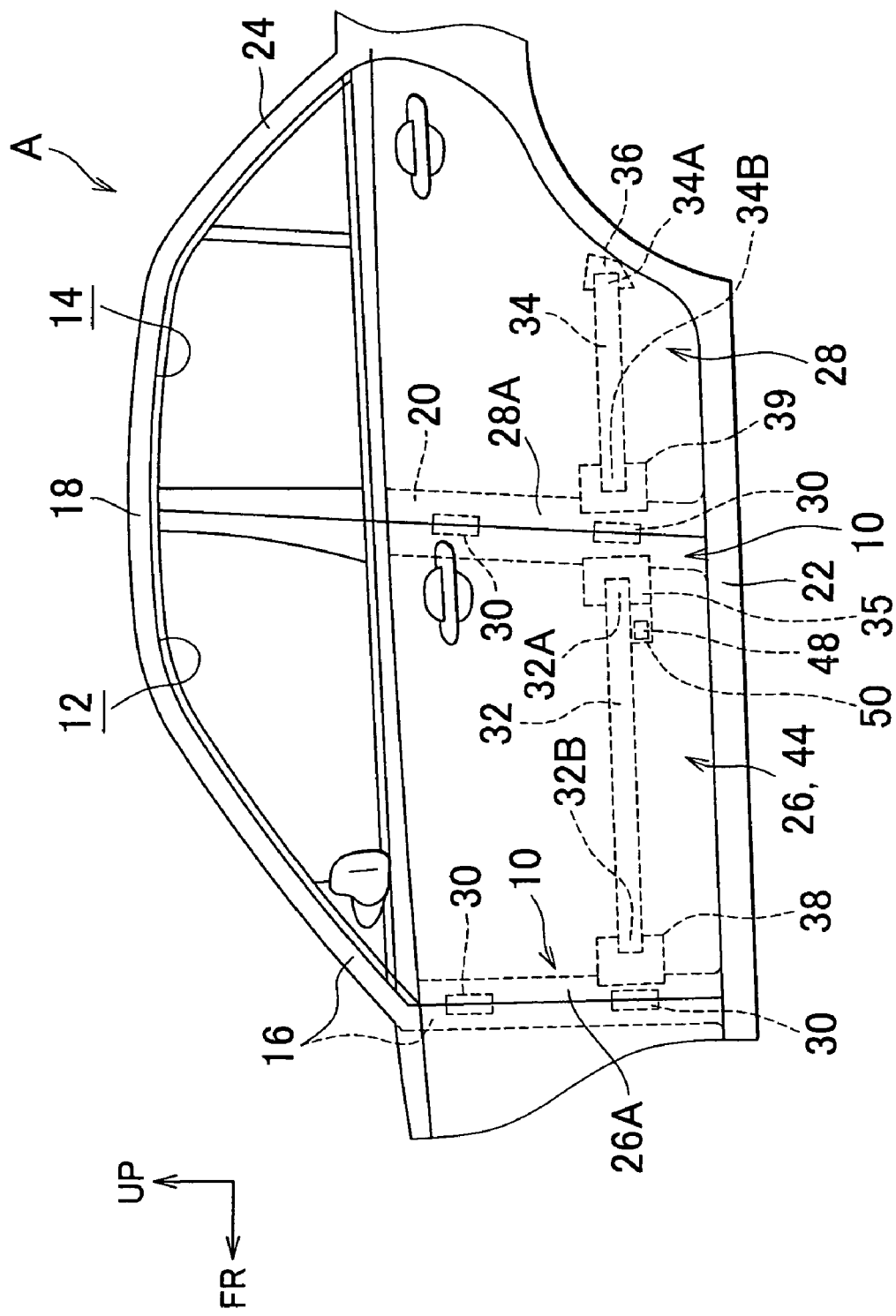

VEHICLE SIDE DOOR STRUCTURE

INCORPORATION BY REFERENCE

The disclosure of Japanese, Patent Application No. 2007-164789 filed on Jun. 22, 2007 including the specification, drawings and abstract is incorporated herein by reference in its entirety.

BACKGROUND

1. Field of the Invention

The invention relates to a vehicle side door structure that is applied to vehicles such as automobiles.

2. Description of Related Art

For example, Japanese Patent Application Publication No. 07-2049 (JP-A-07-2049) describes a technology of fitting an accelerometer to an inner panel of a side door via a supporting member made of a plate metal. The accelerometer outputs a signal based on which a determination is made as to whether an airbag housed in the side door should be deployed.

SUMMARY

However, the above-described technology has a problem that, if a load is locally applied to the side door at a portion distant from the accelerometer, the value indicated by a signal from the accelerometer does not rise sufficiently quickly.

The invention is made in light of the above-described circumstances. It is therefore an object of the invention to provide a vehicle side door structure with which a load locally applied to a vehicle side door is amplified and the amplified load is applied to a collision detector.

An aspect of the invention relates to a vehicle side door structure. The vehicle side door structure includes an inner panel and an outer panel that is positioned on an outer side of the inner panel in a vehicle-width direction, and that forms a closed space in cooperation with the inner panel. The vehicle side door structure also includes an impact beam that extends in a longitudinal direction of a vehicle body, and that is arranged within the closed space at a position close to the outer panel, a bracket that is attached to the inner panel, and that holds a collision detector at a portion of the bracket which is on the inner side of the inner panel in the vehicle-width direction, and a load transmission member that connects the impact beam to the inner panel at a portion that overlaps the bracket from a lateral view.

With the vehicle side door structure according to the aspect of the invention described above, for example, when a collision load is locally applied to a portion of the impact beam, the collision load is transmitted to the inner panel via the load transmission member. In the vehicle side door structure, the bracket that holds the collision detector is arranged in such a manner that the bracket overlaps a portion of the inner panel, to which the load transmission member is connected, from a lateral view. In other words, at least a portion of the bracket overlaps the portion of the inner panel, to which the load transmission member is connected, in the longitudinal direction of the vehicle body and in the vehicle-height direction. Therefore, the load (e.g., acceleration or displacement) is efficiently transmitted from the load transmission member to the collision detector via the bracket.

Thus, with the vehicle side door structure according to the aspect of the invention described above, when a load is locally applied to the impact beam, the load is amplified and the amplified load (e.g., acceleration or displacement) is transmitted to the collision detector.

In the aspect of the invention described above, the load transmission member may connect the impact beam to the inner panel in such a manner that a load externally applied to the impact beam in the vehicle-width direction is transmitted between at least one portion of the bracket, which is fixedly connected to the inner panel, and a holding portion of the bracket, which holds the collision detector.

With this structure, for example, when a collision load is locally applied to a portion of the impact beam, the load is applied from the load transmission member to the bracket at the position (point of load application) between the holding portion of the bracket, which holds the collision detector, and the portion (fulcrum) of the bracket, which is fixedly connected to the inner panel. Thus, with the vehicle side door structure, the load (e.g. acceleration or displacement) to be transmitted to the collision detector is amplified because the bracket functions as a lever.

In the aspect of the invention described above, the collision detector may be arranged at a position close to the rear of the inner panel in the longitudinal direction of the vehicle body. In addition, the bracket may be fixedly connected to the inner panel at least at a portion of the inner panel which is posterior to a portion of the inner panel to which the load transmission member is fixedly connected. Furthermore, the bracket may hold the collision detector at a portion of the bracket which is anterior in the longitudinal direction of the vehicle body to the portion of the inner panel to which the load transmission member is fixedly connected.

With this structure, for example, when a collision load is locally applied to a portion of the impact beam, the load is applied from the load transmission member to the bracket at a middle portion (point of load application) in the longitudinal direction of the vehicle body. This causes a pivot motion (displacement, acceleration) of the bracket about the portion (fulcrum) of the bracket which is fixedly connected to the inner panel and which is posterior to the portion of the bracket to which the load is applied. Therefore, the displacement, acceleration, etc. of the holding portion, which holds the collision detector and which is opposite to the fulcrum with respect to the portion of the bracket to which the load is applied, correspond to the values obtained by amplifying the displacement, acceleration, etc. of the portion of the bracket to which the load is applied. Namely, with this vehicle side door structure, the load (acceleration, displacement) to be transmitted to the collision detector is amplified, because the bracket serves as a lever.

In the vehicle side door structure according to the aspect of the invention described above, the inner panel may be arranged in such a manner that when a load that is equal to or higher than a predetermined value is applied to the impact beam inward in the vehicle-width direction, the inner panel contacts, at the rear end portion in the longitudinal direction of the vehicle body, a vehicle body structural portion.

With this structure, for example, when a collision load which is equal to or higher than the predetermined value is locally applied to a portion of the impact beam, the rear end portion (portion near the rear end portion) of the inner panel contacts the vehicle body structural portion. Therefore, a pivot motion of the bracket about the portion (fulcrum) of the bracket which is connected to the inner panel is easily caused. Accordingly, with this vehicle side door structure, the bracket serves as a lever more effectively. Therefore, more significantly amplified load (e.g., acceleration or displacement) is transmitted to the collision detector. If the structure is employed in which the portion of the bracket which is fixedly connected to the inner panel contacts the vehicle body structural portion, further significantly amplified load is applied to the collision detector.

In the aspect of the invention described above, the holding portion of the bracket that holds the collision detector has an end portion opposite to a portion of the inner panel to which the load transmission member is fixedly connected, and the bracket is formed in such a manner that the end portion is allowed to be displaced relative to the inner panel in the vehicle-width direction.

With this structure, the portion of the bracket which is on the side of the point of load application in the bracket, is allowed to be displaced relative to the inner panel in the vehicle-width direction. Therefore, the force with which the collision detector is restrained by the inner panel is weak. Accordingly, it is possible to apply a further significantly amplified load to the collision detector.

In the aspect of the invention described above, a first portion of the inner panel to which the load transmission member is fixedly connected, and a second portion of the inner panel to which the bracket is fixedly connected, may be within a plate portion of the inner panel, which extends in the longitudinal direction of the vehicle body and in a vehicle-height direction.

In the vehicle side door structure described above, the load transmission member is connected to, and the bracket is fitted to, the substantially flat plate portion of the inner panel. Therefore, it is possible to flexibly set the position (e.g., the point of load application described above) in the bracket, at which the load is transmitted from the load transmission member to the bracket. Therefore, the load that is to be applied to the collision detector (amplification ratio) is adjusted easily on an as-required basis.

Another aspect of the invention relates to a vehicle side door structure for a vehicle having a vehicle body that extends in a longitudinal direction, and the vehicle body having a width in a vehicle-width direction that is orthogonal to the longitudinal direction. The vehicle side door structure includes an inner panel and an outer panel that is positioned on an outer side of the inner panel in the vehicle-width direction, a space existing between the outer panel and the inner panel. The vehicle side door structure also includes an impact beam that extends in the longitudinal direction, and that is arranged within the space adjacent to the outer panel, a bracket that is attached to the inner panel by a connection portion of the bracket, the bracket having a holding portion for holding a collision detector, and a load transmission member that connects the impact beam to the inner panel at a position that overlaps the connection portion of the bracket.

The vehicle side door structure according to the aspect of the invention described above has an excellent effect of amplifying a load that is to be applied to the collision detector when the load is locally applied to the side door.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and in which:

FIG. 2 is an enlarged plane cross-sectional view showing a main portion of the vehicle side door structure according to the first embodiment of the invention;

FIG. 4 is a side view showing an automobile to which the vehicle side door structure according to the first embodiment of the invention is applied;

DETAILED DESCRIPTION OF EMBODIMENTS

Figure 1:
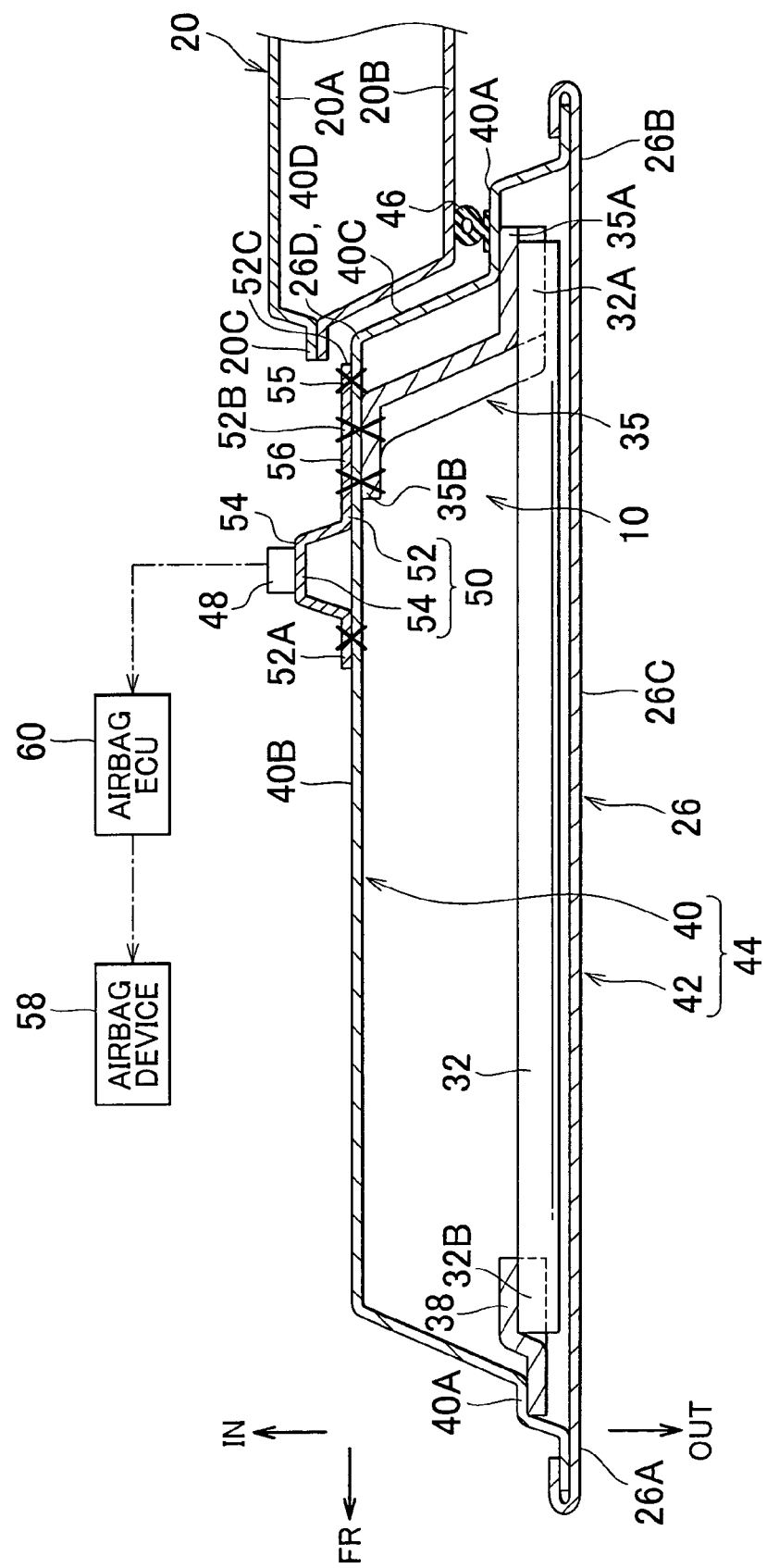
FIG. 1 is a plane cross-sectional view schematically showing a front side door to which a vehicle side door structure according to a first embodiment of the invention is applied.

Hereafter, a vehicle side door structure 10 according to a first embodiment of the invention will be described with reference to FIGS. 1 to 4. An arrow FR, an arrow UP, an arrow IN and an arrow OUT respectively indicate the forward direction (traveling direction), the upward direction, the vehicle-width inward direction, and the vehicle-width outward direction of an automobile to which the vehicle side door structure 10 is applied.

FIG. 4 is a side view showing an automobile A to which the vehicle side door structure 10 is applied. As shown in FIG. 4, the automobile A has a front vehicle body opening 12 and a rear vehicle body opening 14 through which a passenger gets on and off the automobile A. The vehicle body openings 12 and 14 are formed in a side portion of a vehicle body. More specifically, the front vehicle body opening 12 is defined by a front pillar 16, a roof side-rail 18, a center pillar 20, and a rocker 22 that constitute a vehicle body frame. Similarly, the rear vehicle body opening 14 is defined by the center pillar 20, a rear pillar 24, and the rocker 22 that constitute the vehicle body frame.

The front vehicle body opening 12 is opened and closed by a front side door 26, and the rear vehicle body opening 14 is opened and closed by a rear side door 28. Therefore, the width-direction (door width-direction) of the front side door 26 and the rear side door 28 in the first embodiment of the invention matches the longitudinal direction of the vehicle body, and the thickness-direction of the door matches the vehicle-width-direction. In the first embodiment of the invention, the front side door 26 and the rear side door 28 are supported at a front end portion 26A and a front end portion 28A by upper and lower door hinges 30, respectively, in such a manner that the front side door 26 and the rear side door 28 are allowed to pivot about the axes that extend in the vehicle-height direction. In accordance with the pivot motion of the front side door 26 and the rear side door 28, the front vehicle body opening 12 and the rear vehicle body opening 14 are opened and closed, respectively.

The front side door 26 and the rear side door 28 are provided with an impact beam 32 and an impact beam 34, which serve as reinforcing members, respectively. The impact beams 32 and 34 extend in the longitudinal direction of the vehicle body. The impact beams 32 and 34 are connected at rear end portions 32A and 34A to a door body (the impact beam 32 is connected at the rear end portion 32A to a door inner panel 40 which will be described later in detail) via extensions 35 and 36, respectively. In addition, the impact beams 32 and 34 are connected at front end portions 32B and 34B to the door body via extensions 38 and 39, respectively.

The structure in which a collision sensor 48, described later in detail, is fitted to the side door is the main portion of the vehicle side door structure 10 according to the first embodiment of the invention. The vehicle side door structure 10 may be applied to both the front side door 26 and the rear side door 28. However, the configuration of the vehicle side door structure 10 is basically common between the front side door 26 and the rear side door 28. Accordingly, the vehicle side door structure 10 that is applied to the front side door 26 will be mainly described below.

As schematically shown in FIG. 1, the front side door 26 has a door body 44 that is a hollow structural body formed by connecting a peripheral portion of the inner panel 40 and a peripheral portion of an outer panel 42 to each other by the heming process. The inner panel 40 has a portion that is recessed inward in the vehicle-width-direction. The recessed portion of the inner panel 40 opens outward in the vehicle-width direction. The impact beam 32 is arranged inside the door body 44.

More specific description will be provided below. Front and rear shallow portions 40A, of which the depth is less than that of the other portion of the recessed portion, are formed in the door inner panel 40. Thus, the front end portion 26A and a rear end portion 26B of the front side door 26 are thinner than a center portion of the front side door 26. The impact beam 32 is connected to the front and rear shallow portions 40A via the extensions 35 and 38. In this way, the impact beam 32 is fixed to the door body 44 at a position close to the outer panel 42.

As shown in FIG. 1, when the front side door 26 is at a position at which it closes the front vehicle body opening 12, the rear end portion 26B overlaps the center pillar 20 (the rear end portion 26B overlaps the center pillar 20 in the longitudinal direction of the vehicle body and in the vehicle-height direction when the front side door 26 and the center pillar 20 are viewed from the outside of the vehicle in the vehicle width direction) from a lateral view. In this state, a weather-strip 46 is located between the rear end portion 26B of the front side door 26 and the center pillar 20.

In addition, the front side door 26 is structured in such a manner that a corner portion 26D that is at the rear end of a thick portion 26C (thick portion formed between the front end portion 26A and the rear end portion 26B) overlaps a connection flange 20C at which an inner panel 20A and an outer panel 20B of the center pillar 20 are connected to each other (the corner portion 26D overlaps the connection flange 20C in the longitudinal direction of the vehicle body and in the vehicle-height direction when the front side door 26 and the center pillar 20 are viewed from the outside of the vehicle in the vehicle width direction) from a lateral view.

Thus, the front side door 26 and the center pillar 20 are arranged in such a manner that if the rear end portion 26B is displaced inward in the vehicle-width-direction, the corner portion 26D contacts the connection flange 20C. The corner portion 26D of the front side door 26 is formed as a corner portion 40D of the inner panel 40. At the corner portion 40D, a plate portion 40B, which extends between the front and rear shallow portions 40A of the inner panel 40 in the longitudinal direction of the vehicle body and in the vehicle-height direction, meets a lateral wall portion 40C, which connects the plate portion 40B to the shallow portion 40A. Namely, the center pillar 20 and the connection flange 20C function as a vehicle body structural portion according to one embodiment of the invention. The corner portion 40D functions as a rear end portion of the inner panel 40 according to one embodiment of the invention.

In the front side door 26 to which the vehicle side door structure 10 is applied, the extension 35 includes an outer connection portion 35A and an inner connection portion 35B. The outer connection portion 35A is connected to the shallow portion 40A of the inner panel 40. The inner connection portion 35B is connected at a vehicle-width-direction inner end to the plate portion 40B of the inner panel 40. The extension 35 is arranged in such a manner that a portion thereof, which extends between the outer connection portion 35A and the inner connection portion 35B, extends inward in the vehicle-width direction. The inner connection portion 35B of the extension 35 is connected to the plate portion 40B at a position that is anterior to the corner portion 40D of the inner panel 40 by a predetermined distance L1 (see FIG. 2) in the longitudinal direction of the vehicle body. The extension 35 functions as a load transmission member according to one embodiment of the invention.

In the front side door 26 to which the vehicle side door structure 10 is applied, the collision sensor 48, which serves as a collision detector that detects a side collision if it occurs, is connected to the inner panel 40 via a bracket 50. The collision sensor 48 is arranged near the position at which the inner connection portion 35B is connected to the plate portion 40B, namely, near a lower rear corner portion of the front side door 26 from a lateral view (see FIG. 4). The collision sensor 48 is arranged at a position substantially lateral to a front seat passenger who gets in and off the automobile A through the front vehicle body opening 12.

As shown in FIG. 1 and FIG. 2, which is a partially enlarged view of FIG. 1, the bracket 50 has a base portion 52 that is connected to the plate portion 40B and a holding portion 54 that projects from the base portion 52 inward in the vehicle-width-direction. The collision sensor 48 is fixedly attached to the holding portion 54 by using, for example, adhesive bonding or fastening.

The base portion 52 includes a front base portion 52A that is positioned anterior to the holding portion 54 in the longitudinal direction of the vehicle body, and a rear base portion 52B that is positioned posterior to the holding portion 54 in the longitudinal direction of the vehicle body. The front base portion 52A is fixedly connected to the plate portion 40B by spot welding. The X-marks in each figure indicate the points of spot welding.

A rear end portion 52C of the rear base portion 52B is disposed at a position posterior to the rear end of the region in which the inner connection portion 35B of the extension 35 is connected to the plate portion 40B in the longitudinal direction of the vehicle body (at a position immediately anterior to the corner portion 40D). The rear base portion 52B is connected to the plate portion 40B at the rear end portion 52C by spot welding. Hereinafter, this connection portion will be referred to as a rear end connection portion 55.

In the first embodiment of the invention, the rear base portion 52B is connected to the plate portion 40B of the inner panel 40 at multiple portions including the rear end connection portion 55. In addition, a portion of the rear base portion 52B, which is located between the rear end connection portion 55 and the holding portion 54, is fixed to the plate portion 40B and the inner connection portion 35B of the extension 35 by spot welding. This portion of the rear base portion 52B, the plate portion 40B and the inner connection portion 35B of the extension 35 are stacked on top of each other to form three layers.

Thus, in the front side door 26 to which the vehicle side door structure 10 is applied, a connection portion of the plate portion 40B, to which the inner connection portion 35B is connected, is located between the holding portion 54 (position at which the collision sensor 48 is held) and the rear end connection portion 55 of the bracket 50 in the longitudinal direction of the vehicle body. Namely, the bracket 50 has a structure in which the rear end connection portion 55 (fulcrum), a load applied portion 56 to which a load from the extension 35 is applied (point of application of load input in the bracket 50), and the holding portion 54 that holds the collision sensor 48 (point of application of load output from the bracket 50) are arranged in line in this order from the rear in the longitudinal direction of the vehicle body.

In the first embodiment of the invention, as shown in FIG. 2, the distance from the rear end connection portion 55 to the load applied portion 56 along the longitudinal direction of the vehicle body is expressed as L2, the distance from the rear end connection portion 55 to the holding portion 54 (collision sensor 48) along the longitudinal direction of the vehicle body is expressed as L3 (>L2), and the distance from the corner portion 40D (corner portion 26D) to the holding portion 54 along the longitudinal direction of the vehicle body is expressed as L4>(>L1).

In the first embodiment of the invention, an accelerometer is used as the collision sensor 48 held by the bracket 50. The collision sensor 48 outputs a signal indicating the acceleration directed in the vehicle-width-direction. The collision sensor 48 is electrically connected to an airbag ECU 60 that serves as a control unit which controls an operation of an airbag device 58 (airbag ECU 60 determines whether the airbag device 58 should be deployed). The airbag ECU 60 transmits a deployment signal to the airbag device 58, for example, when a signal indicating a value equal to or higher than a threshold value is transmitted from the collision sensor 48. In the first embodiment of the invention, a side collision airbag device, for example, a side airbag or a curtain airbag is used as the airbag device 58.

Next, the effects of the first embodiment of the invention will be described.

In the automobile A in which the above-described vehicle side door structure 10 is applied to the front side door 26, when a side collision to the front side door 26 occurs, a collision load applied to the impact beam 32 is transmitted to (input into) the collision sensor 48 via the extension 35, the inner panel 40 and the bracket 50, and the collision sensor 48 outputs a signal indicating the received impact (acceleration). The signal is transmitted to the airbag ECU 60. If the value indicated by the signal from the collision sensor 48 is lower than the threshold value, the airbag ECU 60 does not allow deployment of the airbag device 58. On the other hand, if the value indicated by the signal from the collision sensor 48 is equal to or higher than the threshold value, the airbag ECU 60 deploys the airbag device 58.

In the bracket 50 of the vehicle side door structure 10, the load applied portion 56, to which a load from the extension 35 is applied, is formed between the holding portion 54, which holds the collision sensor 48, and the rear end connection portion 55, which is connected to the inner panel 40. Therefore, when a load equal to or higher than the predetermined value is applied from the extension 35 to the load applied portion 56 and therefore the corner, portion 40D of the inner panel 40 contacts the connection flange 20C of the center pillar 20, the bracket 50 together with the plate portion 40B is pivotally displaced in the direction of an arrow B (see FIG. 3A), using the rear end connection portion 55 or the corner portion 40D as a fulcrum, by a load F that is applied to the load applied portion 56 inward in the vehicle width-direction.

Therefore, the amount of displacement of the collision sensor 48 held by the holding portion 54 of the bracket 50 and the acceleration applied to the collision sensor 48 are greater than the amount of displacement of the load applied portion 56 and the acceleration applied to the load applied portion 56. The values of the amount of displacement of the collision sensor 48 and the acceleration applied to the collision sensor 48 are obtained by amplifying the amount of displacement of the load applied portion 56 and the acceleration applied to the load applied portion 56 using the lever ratio (L3/L2 or L4/L1) derived based on the distance from the fulcrum.

Figure 3A:
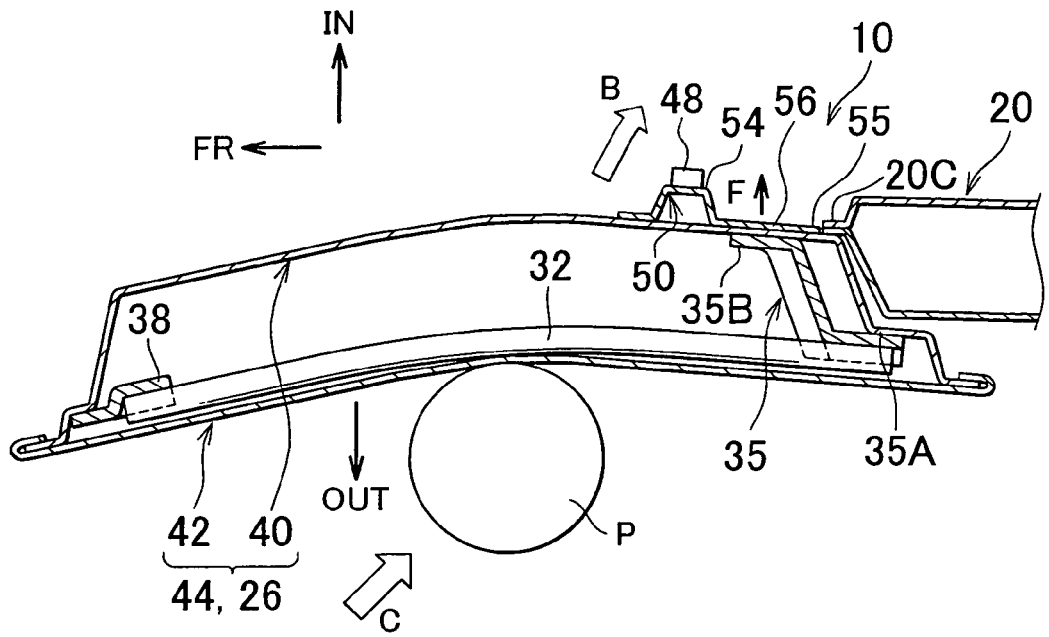
FIG. 3A is a plane cross-sectional view schematically showing the manner in which the front side door, to which the vehicle side door structure according to the first embodiment of the invention is applied, is deformed when colliding with a pole.
Figure 3B:
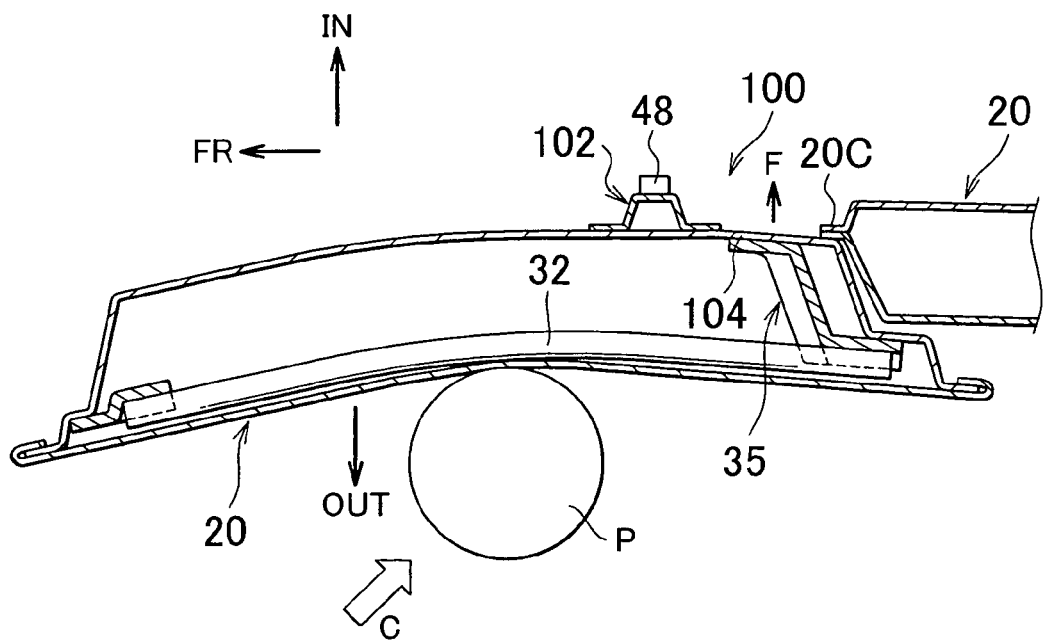
FIG. 3B is a plane cross-sectional view schematically showing the manner in which a front side door in a comparative example is deformed when colliding with a pole.
Figure 6:
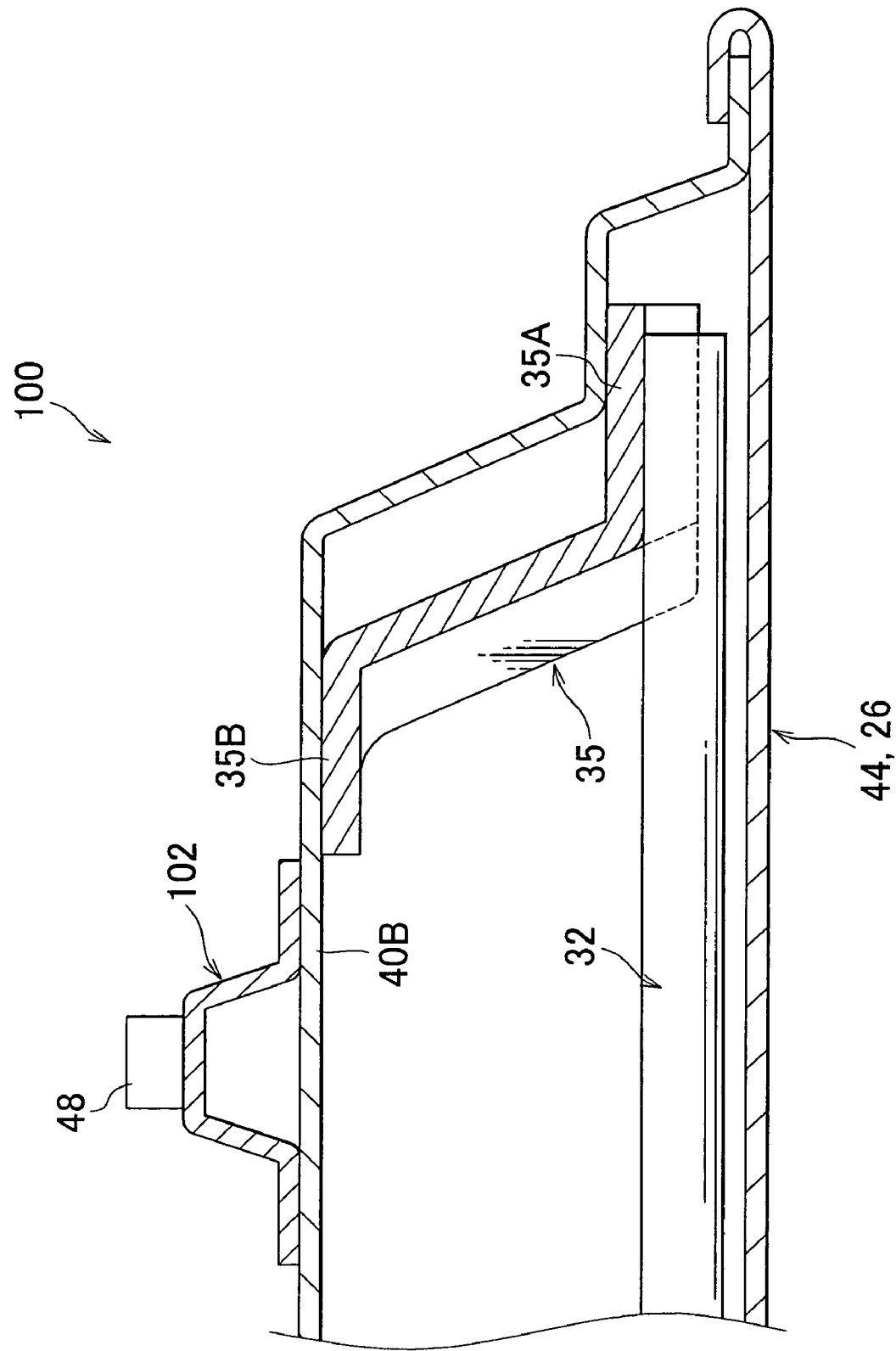
FIG. 6 is a plane cross-sectional view showing a vehicle side door structure in the comparative example.

For example, in a vehicle side door structure 100 in a comparative example shown in FIG. 6, a bracket 102 that holds the collision sensor 48, which is arranged at a position substantially lateral to a front seat passenger, is positioned anterior to the inner connection portion 35B of the extension 35 in the longitudinal direction of the vehicle body. Therefore, an acceleration which is substantially the same as the acceleration that is applied from the inner connection portion 35B to a load applied portion 104 (see FIG. 3B) via the plate portion 40B is applied to the collision sensor 48. Therefore, with the vehicle side door structure 100, if a load is locally applied to the front side door 26, for example, if a pole P collides with the front side door 26 at a position anterior to the collision sensor 48 by a large amount in the longitudinal direction of the vehicle body as shown in FIG. 3B, there is a possibility that the value indicated by a signal output from the collision sensor 48 does not rise sufficiently quickly. This is problematic especially when the air bag device 58 needs to be deployed quickly, for example, when the pole P collides with the front side door 26 in the direction of an arrow C. Therefore, in order to reliably deploy the airbag device 58 even when such a collision occurs, in the vehicle side door structure 100, the airbag ECU 60 sets the threshold value at which the airbag device 58 is deployed to a lower value. However, in this case, the airbag device 58 may be deployed even when a light collision that does not require deployment of the airbag device 58 occurs, which may cause an increase in repair cost.

In contrast, with the vehicle side door structure 10, the acceleration that has been amplified using the bracket 50 as a fulcrum is applied to the collision sensor 48 as described above. Therefore, as shown in FIG. 3A, even when a load is locally applied to the front side door 26, for example, even when the pole P collides with the front side door at a position anterior to the collision sensor 48 by a large amount in the longitudinal direction of the vehicle body, it is possible to cause the collision sensor 48 to transmit a signal indicating a larger value to the airbag ECU 60. Therefore, with the vehicle side door structure 10, even when the pole P collides to the front side door 26 in the direction of the arrow C as shown in FIG. 3A, it is possible to deploy the airbag device 58 sufficiently quickly (within a sufficiently short time). Thus, with the vehicle side door structure 10, it is possible to set the threshold value which is used by the airbag ECU 60 to determine whether the airbag device 58 should be deployed to a high value.

Meanwhile, when a light collision that does not require deployment of the airbag device 58 occurs, namely, when a collision, which does not cause contact between the corner portion 40D of the inner panel 40 and the connection flange 20C of the center pillar 20, occurs, the bracket 50 is not pivotally displaced in the direction of the arrow B, and the inner panel 40, namely, the front side door 26, is entirely accelerated inward in the vehicle-width-direction. Therefore, amplification of the acceleration using the bracket 50 as a fulcrum does not occur. As described above, with the vehicle side door structure 10, the value indicated by a signal output from the collision sensor 48 is amplified only when the airbag device 58 need to be deployed (when an on-signal is output) whereas the value indicated by the signal output from the collision sensor 48 is not amplified when the airbag device 58 need not be deployed (when an off-signal is output).

Therefore, for example, when a light collision to the front side door at a position close to the collision sensor 48 occurs, the value indicated by a signal transmitted from the collision sensor 48 to the airbag ECU 60 is maintained at a low value (the same level as that when the vehicle side door structure 100 is employed). Therefore, the difference in the value indicated by a signal output from the collision sensor 48 is made large, for example, when a side collision with a pole occurs compared to when a light collision occurs. Thus, with the vehicle side door structure 10, the airbag device 58 is reliably deployed when a side collision with a pole occurs, and occurrence of deployment of the airbag device 58 due to a light collision is effectively prevented or minimized.

In the vehicle side door structure 10, the rear end portion 52C of the bracket 50 and the inner connection portion 35B of the extension 35 are connected to the plate portion 40B of the inner panel 40 to form the load applied portion 56 and the rear end connection portion 55. Therefore, the distances L1 to L4 are easily set. Accordingly, the lever ratio of the bracket 50 is easily set (adjusted) on an as-required basis. As a result, the threshold value used to determine whether the airbag device 58 should be deployed is easily controlled based on the type and specifications of the vehicle.

Next, a vehicle side door structure 70 according to a second embodiment of the invention will be described with reference to FIG. 5. Basically the same components and portions as those in the first embodiment of the invention will be denoted by the same reference numerals as those in the first embodiment, and the description thereof will not be provided below.

Figure 5:
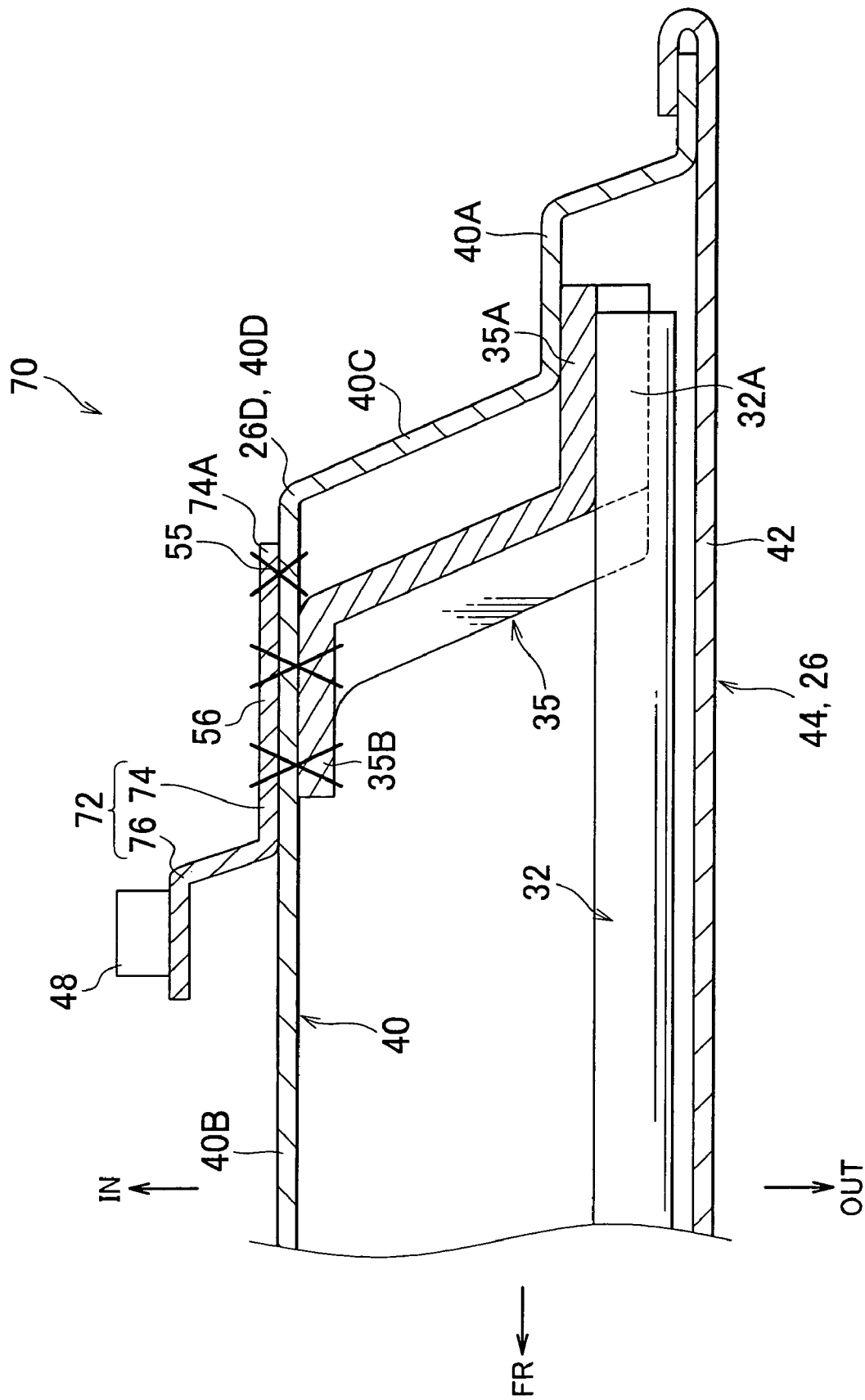
FIG. 5 is an enlarged plane cross-sectional view showing a main portion of a vehicle side door structure according to a second embodiment of the invention.

FIG. 5 shows a main portion of the vehicle side door structure 70 in a plane cross-sectional view that corresponds to FIG. 2. As shown in FIG. 5, the vehicle side door structure 70 differs from the vehicle side door structure 10 according to the first embodiment of the invention in that the vehicle side door structure 70 includes a bracket 72 that does not have a portion corresponding to the front base portion 52A, instead of the bracket 50 having the front base portion 52A at the base portion 52.

More specifically, the bracket 72 includes a base portion 74 that is connected to the plate portion 40B and a holding portion 76 that projects from a vehicle-body-longitudinal-direction front end portion of the base portion 74 inward in the vehicle-width-direction. The collision sensor 48 is fixedly attached by the holding portion 76 by using, for example, adhesive bonding or fastening.

A rear end portion 74A of the base portion 74 is at a position posterior to the rear end of the connection region, in which the inner connection portion 35B of the extension 35 is connected to the plate portion 40B, in the longitudinal direction of the vehicle body (at a position immediately anterior to the corner portion 40D). The rear end portion 74A is connected to the plate portion 40B by spot welding to form the rear end connection portion 55. Therefore, the portion anterior to the front end of the base portion 74, that is, the holding portion 76 (collision sensor 48) is not connected to the plate portion 40B, and is allowed to be displaced relative to the plate portion 40B in the vehicle-width-direction. The other configuration of the vehicle side door structure 70 is the same as that of the vehicle side door structure 10.

Therefore, the vehicle side door structure 70 according to the second embodiment of the invention produces basically the same effects as those of the vehicle side door structure 10 according to the first embodiment of the invention. In the vehicle side door structure 70, the holding portion 76 (front end) of the bracket 72, which holds the collision sensor 48, is not fixed to the inner panel 40 (may be displaced relative to the inner panel 40 in the vehicle-width-direction). Therefore, the force with which the collision sensor 48 is restrained by the inner panel 40 (plate portion 40B) is smaller than that in the vehicle side door structure 10. Accordingly, the acceleration is amplified more effectively by an inertia action in addition to the action of a lever.

In the above-described embodiments of the invention, the vehicle side door structure 10 and the vehicle side door structure 70 are applied to the front side door 26. Alternatively, the vehicle side door structure 10 and the vehicle side door structure 70 may be applied to the rear side door 28. In this case, the vehicle side door structure 10 and the vehicle side door structure 70 are modified so that the pivotal displacement of the brackets 50 and 72 is caused due to a contact with the rear pillar 24 instead of the center pillar 20.

In the above-described embodiments of the invention, the load applied portion 56 of the bracket 50, which is arranged between the rear end connection portion 55 and the holding portion 54 of the bracket 50 is connected to the inner connection portion 35B and plate portion 40B, and the load applied portion 56 of the bracket 72, which is arranged between the rear end connection portion 55 and the holding portion 76 of the bracket 72 is connected to the inner connection portion 35B and the plate portion 40B. However, the invention is not limited to this arrangement. For example, the structure in which portions of the rear base portion 52B and the base portion 74 other than the rear end portions 52C and 74A (rear end connection portion 55) are not connected to (or not contacted to) the plate portions 40B, respectively, may be employed.

In the above-described embodiments of the invention, the rear end connection portion 55 is connected to the plate portion 40B. However, the invention is not limited to this arrangement. For example, the rear end portions 52C and 74A may be formed into bent portions and connected to the lateral wall portions 40C to form the rear end connection portions 55.

In the above-described embodiments of the invention, the collision sensor 48, which is an accelerometer, is used as a collision detector. However, the invention is not limited to this arrangement. For example, an acceleration switch (having a movable portion), which outputs an on-signal when a load that is equal to or higher than a predetermined value is applied to the side door, may be used instead of a sensor that outputs a linear signal based on the acceleration.

The invention may be implemented in various other embodiments within the scope of the invention.

What is claimed is:

1. A vehicle side door structure comprising:
   an inner panel;
   an outer panel that is positioned on an outer side of the inner panel in a vehicle-width direction, and that forms a closed space in cooperation with the inner panel;
   an impact beam that extends in a longitudinal direction of a vehicle body, and that is arranged within the closed space at a position close to the outer panel;
   a bracket that is attached to the inner panel, and that holds a collision detector at a portion of the bracket which is on an inner side of the inner panel in the vehicle-width direction; and
   a load transmission member that connects the impact beam to the inner panel at a portion that overlaps the bracket from a lateral view, wherein:
   the collision detector is arranged at a position closer to a rear of the inner panel than to a middle of the inner panel in the longitudinal direction of the vehicle body;

the bracket is fixedly connected to the inner panel at a portion of the inner panel which is posterior to a portion of the inner panel to which the load transmission member is fixedly connected; and the bracket holds the collision detector at a portion of the bracket which is anterior in the longitudinal direction of the vehicle body to the portion of the inner panel to which the load transmission member is fixedly connected.

2. The vehicle side door structure according to claim 1, wherein the load transmission member connects the impact beam to the inner panel in such a manner that a load externally applied to the impact beam in the vehicle-width direction is transmitted between at least one portion of the bracket, which is fixedly connected to the inner panel, and a holding portion of the bracket, which holds the collision detector.

3. The vehicle side door structure according to claim 1, wherein the inner panel is arranged in such a manner that when a load that is equal to or higher than a predetermined value is applied to the impact beam inward in the vehicle-width direction, the inner panel contacts, at a rear end portion in the longitudinal direction of the vehicle body, a vehicle body structural portion.

4. The vehicle side door structure according to claim 2, wherein the holding portion of the bracket has an end portion opposite to a portion of the inner panel to which the load transmission member is fixedly connected, and the bracket is formed in such a manner that the end portion is allowed to be displaced relative to the inner panel in the vehicle-width direction.

5. The vehicle side door structure according to claim 1, wherein a first portion of the inner panel to which the load transmission member is fixedly connected, and a second portion of the inner panel to which the bracket is fixedly connected, are within a plate portion of the inner panel which extends in the longitudinal direction of the vehicle body and in a vehicle-height direction.

6. A vehicle side door structure for a vehicle having a vehicle body that extends in a longitudinal direction, the vehicle body having a width in a vehicle-width direction that is orthogonal to the longitudinal direction, the vehicle side door structure comprising:

an inner panel;

an outer panel that is positioned on an outer side of the inner panel in the vehicle-width direction, a space existing between the outer panel and the inner panel;

an impact beam that extends in the longitudinal direction, and that is arranged within the space adjacent to the outer panel;

a bracket that is attached to the inner panel by a connection portion of the bracket, the bracket having a holding portion for holding a collision detector; and a load transmission member that connects the impact beam to the inner panel at a position that overlaps the connection portion of the bracket, wherein:

the holding portion of the bracket is arranged at a position closer to a rear of the inner panel than to a middle of the inner panel in the longitudinal direction;

the bracket is fixedly connected to the inner panel at a portion of the inner panel which is posterior to a portion of the inner panel to which the load transmission member is fixedly connected; and the holding portion of the bracket is anterior in the longitudinal direction to the portion of the inner panel to which the load transmission member is fixedly connected.

7. The vehicle side door structure according to claim 6, wherein the connection portion extends from the holding portion in the longitudinal direction rearwardly toward the rear of the inner panel.

8. The vehicle side door structure according to claim 6, wherein the load transmission member connects the impact beam to the inner panel at a location of the inner panel that is between the holding portion of the bracket and a fixing portion of the bracket that is fixedly connected to the inner panel.

9. The vehicle side door structure according to claim 6, wherein the inner panel is arranged in such a manner that when a load that is equal to or higher than a predetermined value is applied to the impact beam inward in the vehicle-width direction, the inner panel contacts, at a rear end portion in the longitudinal direction of the vehicle body, a vehicle body structural portion.

10. The vehicle side door structure according to claim 8, wherein the holding portion of the bracket has an end portion opposite to a portion of the inner panel to which the load transmission member is fixedly connected, the end portion being spaced from the inner panel so that the end portion is movable relative to the inner panel in the vehicle-width direction.

11. The vehicle side door structure according to claim 6, wherein a first portion of the inner panel to which the load transmission member is fixedly connected, and a second portion of the inner panel to which the bracket is fixedly connected, are within a plate portion of the inner panel which extends in the longitudinal direction and in a vehicle-height direction.

12. The vehicle side door structure according to claim 6, wherein the bracket is attached to an inner side of the inner panel in the vehicle-width direction, and the holding portion of the bracket is disposed at a portion of the bracket which is on an inner side of the inner panel in the vehicle-width direction.

13. The vehicle side door structure according to claim 6, further comprising a collision detector attached to the holding portion of the bracket.

* * * * *